BEST AVAILABLE COPY
W. A. SCOTT, JR.
VENTILATOR.
APPLICATION FILED SEPT. 9, 1910.
Reissued Dec. 6, 1910. 13,179.
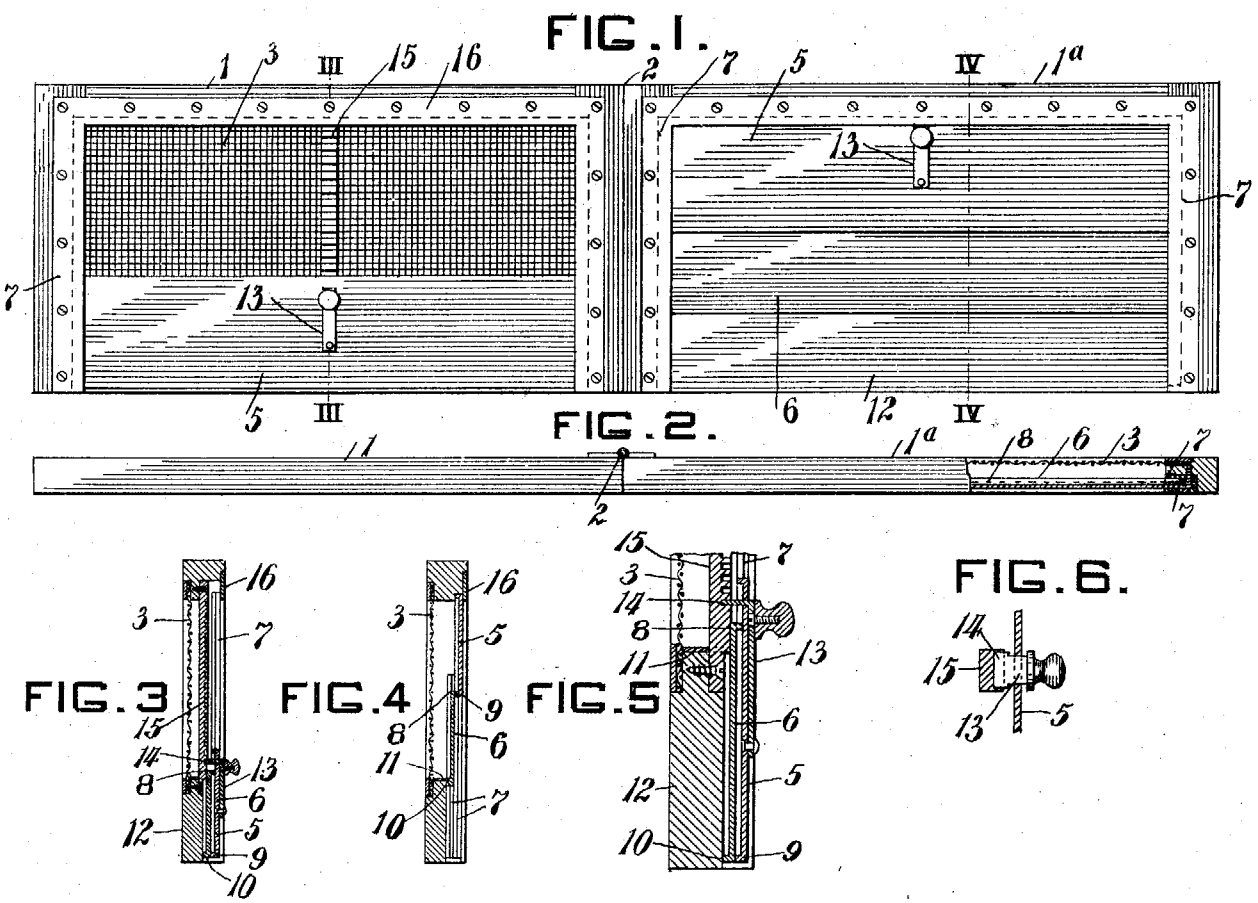
WITNESSES
G. G. Trill
Alice A. Trill.
INVENTOR
William A. Scott Jr
by Dannis S. Wolcott

BEST AVAILABLE COPY

UNITED STATES PATENT OFFICE.

WILLIAM A. SCOTT, JR., OF PITTSBURG, PENNSYLVANIA, ASSIGNOR TO AMERICAN CAR SCREEN COMPANY, OF PITTSBURG, PENNSYLVANIA.

VENTILATOR.

13,179. Specification of Reissued Letters Patent. Reissued Dec. 6, 1910.

Original No. 935,864, dated October 5, 1909, Serial No. 459,715. Application for reissue filed September 9, 1910. Serial No. 581,337.

*To all whom it may concern:*

Be it known that I, WILLIAM A. SCOTT, Jr., residing at Pittsburg, in the county of Allegheny and State of Pennsylvania, a citizen of the United States, have invented or discovered certain new and useful Improvements in Ventilators, of which improvements the following is a specification.

As is well known to travelers the ventilators placed in car windows form an opening of fixed dimensions, and that when the draft is great and smoke, etc., are admitted as in passing through tunnels, the ventilator must be removed or the second window sash lowered. Either of these operations causes considerable labor and annoyance.

The invention described herein has for its object a combination of ventilator and movable leaves or plates whereby the ventilating opening may be varied easily and quickly without removing the ventilator or moving the window sashes.

The invention is hereinafter more fully described and claimed.

In the accompanying drawings forming a part of this specification Figure 1 is a side elevation of a ventilator for the windows of the cars, one-half the ventilator being shown open and the other closed; Fig. 2 is a top plan view of the same, a portion of the frame of the ventilator at one corner being broken away; Figs. 3 and 4 are sectional views on planes indicated respectively by the lines III—III and IV—IV Fig. 1; Fig. 5 is a sectional view showing the parts in the position shown in Fig. 3, on an enlarged scale; and Fig. 6 is an enlarged detail view of a form of catch.

In the practice of my invention the ventilator is, as is customary, made in two sections 1 and 1[a], hinged together at 2. Each section is provided with an opening over which is secured a wire screening 3 to prevent the entrance of cinders, etc. In order to provide for the partial or entire closing of each of these openings, as may be required by circumstances, two or more thin metal plates 5 and 6 have their ends mounted in guideways 7 secured to the ends of the openings in the frame sections. The inner plate 6 has its upper edge turned outwardly forming a flange 8 adapted in certain positions of the plates to engage a corresponding inwardly projecting flange 9 on the outer plate 5. By this construction when the outer plate 5 is raised a distance approximately equal to the width of the inner plate the flange 9 will engage the flange 8 and cause the plate 6 to move inwardly until an inwardly projecting flange 10 on the plate 6 engages the stop 11, preferably consisting of a metal strip secured to the lower bar 12 of the frame and projecting inwardly to engage flange 10. The plates or slats 5 and 6 are made of such width dependent upon the number of plates used and the width of the openings in the frame sections that when fully extended they will entirely close the opening formed in each section of the frame or ventilator.

In order to hold the plates in different positions according to the ventilating opening required, a toothed bar 15 adapted to be engaged by a lip or projection 14 on one of the plates, is arranged transversely in the opening designed to be closed by the plates, its ends being secured to opposite members, or bars of the frame sections. As these removable ventilating frames are subject to rough treatment the plates 5 and 6 are made of substantially the same width as one of the bars forming the frame sections so that when shifted out of line with the opening the plates will be supported and protected by the bar against which they lie when folded. When raised to close the opening the plates being resilient will be supported as against injuries by the bar 15. As when in folded position the inner plate or plates are covered by the outer plate, the catch lip and the knob 17 whereby the lip is withdrawn from engagement with the bar 15, are carried by the outer plate, the lip extending across the inner plate or plates, when in engagement with the bar. For convenience of operation the lip 14 should be pressed in normally, so as to automatically engage the bar when the knob is released. This engagement of the lip with the bar may be due to the resilience of the plate 5, or the lip can be conveniently formed integral with a spring 13 attached to the plate. By means of this catch the closing plates may be adjusted to any desired position according to the opening required. And further the catch should be so constructed that if the ventilator is put in the reverse position to that shown in Fig. 1, as is sometimes necessary when wind guards are attached to the ventilator frame, the catch will operate to hold the plates in any position desired, either entirely up or partially down. It is preferred that the outer plate 5 should be made of such a width that its upper end will project behind the guard plate 16 when the plates are fully raised.

It will be observed that when the plates are fully raised the flange at the lower edge of the inner plate 6 will make a tight joint with a stop strip 11, a similar joint being formed between the flanges 8 and 9 of the two plates and that the upper edge of the outer plate will project behind the guard plate 16 so that a tight closure of the opening is formed which will effectually prevent the entrance of smoke, etc.

The wire netting 3 is usually secured in a rabbet formed in one side of the bars forming the frame. In applying my improvement the bars of the sections behind which the plates lie when folded are cut away or made thinner so that the guide groove 7 may be formed in the inner faces of the bars forming the frame sections, so that my improvement can be readily applied to ventilating frames now in use.

I claim herein as my invention:

1. A removable ventilator for car windows consisting of a frame, a plurality of plates each having a width approximately equal to the width of one of the bars forming the frame, adjacent plates being provided with interlocking means whereby one plate may be shifted by the other, a plurality of guide grooves for the reception of the ends of the plates in the bars adjacent to the bar or frame member behind which the plates lie when folded and extending across said bar or member, and a bar extending across the opening in the frame and adapted to support the plates as against injury.

2. A ventilator having in combination an open frame, a plurality of guiding grooves arranged at opposite ends of the frame grooves extending across the bottom bar of the frame, a plurality of plates having a width approximately equal to that of the bottom bar of the frame and having their ends arranged in said grooves, adjacent plates being provided with interlocking devices whereby one plate is shifted by the other in its movement, a toothed bar arranged across the opening of the frame and a lip or projection on one of the plates yieldingly held in engagement with the bar.

3. A ventilator having in combination an open frame, a plurality of guiding grooves at the ends of the frame, a plurality of plates having their ends arranged in the grooves, interlocking means on adjacent plates whereby one plate may shift the other plate, a toothed bar extending across the frame in the direction of the movement of the plates and adjacent to the plane of movement of the inner plate, and a lip or projection on the outer plate extending across the inner plate to engage said bar.

4. A ventilator consisting of an open frame, a plurality of plates arranged to move in parallel planes, adjacent plates being provided with interlocking means whereby a plate may be shifted by an adjacent plate; a bar extending in the direction of movement of the plates, and means on one of the outer plates of the series adapted to engage said bar and support the plates in any desired position.

5. A ventilator consisting of an open frame, a plurality of plates arranged to move in parallel planes, means for connecting a plate to the next inner plate on the movement of the outer plate a distance approximately equal to its width, a bar extending in the direction of movement of the plates and adjacent to the plane of movement of the inner plate and means on the outer plate of the series adapted to engage said bar and support the plates in any desired position.

6. A ventilator consisting of an open frame adapted to be removably held between the sash and sill of a car or other window, a plurality of plates arranged to move in parallel planes to vary the area of the ventilating opening, said plates being provided on adjacent edges with interlocking means whereby a plate may be shifted by an adjacent plate, and a catch carried by the outer plate of the series and adapted to engage a stationary portion of the frame and support all the plates at any desired height.

7. A ventilator consisting of an open frame adapted to be removably held between the sash and sill of a car or other window, a plurality of plates movably mounted in parallel grooves in the frame to vary the area of the ventilating opening, said plates being provided with means whereby each plate after a predetermined independent movement will shift an adjacent plate, and a catch carried by a plate of the series and adapted to engage a stationary portion of the frame and support all of the plates at any desired height.

8. A ventilator consisting of an open frame adapted to be removably held between the sash and sill of a car or other window, a plurality of plates movably mounted in parallel grooves in the frame to vary the area of the ventilating opening, said plates being provided with means whereby each plate after a predetermined independent movement will shift an adjacent plate, and a spring catch carried by a plate of the series and adapted to engage a stationary portion of the frame and support all of the plates at any desired height.

In testimony whereof, I have hereunto set my hand.

WILLIAM A. SCOTT, Jr.

Witnesses:
G. G. Trill,
Thomas Joyce.

BEST AVAILABLE COPY